United States Patent
Law et al.

(10) Patent No.: US 8,346,159 B2
(45) Date of Patent: Jan. 1, 2013

(54) CONFIGURATION OF BASE STATION REPEATER

(75) Inventors: Alan Law, Basingstoke (GB); Roger Beck, Hungerford (GB); Toby Proctor, Salisbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 237 days.

(21) Appl. No.: 12/311,412

(22) PCT Filed: Oct. 4, 2007
(Under 37 CFR 1.47)

(86) PCT No.: PCT/GB2007/003756
§ 371 (c)(1),
(2), (4) Date: Apr. 20, 2010

(87) PCT Pub. No.: WO2008/040972
PCT Pub. Date: Apr. 10, 2008

(65) Prior Publication Data
US 2010/0297994 A1    Nov. 25, 2010

(30) Foreign Application Priority Data
Oct. 4, 2006    (GB) .................................. 0619603.4

(51) Int. Cl.
H04B 7/15    (2006.01)
H04M 1/00    (2006.01)

(52) U.S. Cl. .................................... 455/11.1; 455/552.1
(58) Field of Classification Search .................. None
See application file for complete search history.

(56) References Cited

U.S. PATENT DOCUMENTS

| | | | |
|---|---|---|---|
| 6,574,472 B1 | 6/2003 | Scheinert | |
| 6,768,897 B1 * | 7/2004 | Suonvieri | 455/15 |
| 2002/0177401 A1 | 11/2002 | Judd et al. | |
| 2003/0157929 A1 * | 8/2003 | Janssen et al. | 455/416 |
| 2003/0232595 A1 | 12/2003 | Baker et al. | |
| 2003/0236067 A1 | 12/2003 | Hasarchi et al. | |
| 2005/0232223 A1 * | 10/2005 | Muller | 370/350 |
| 2006/0046644 A1 * | 3/2006 | Chung et al. | 455/11.1 |

FOREIGN PATENT DOCUMENTS

| | | |
|---|---|---|
| DE | 19649855 A1 | 6/1998 |
| JP | 5840938 A1 | 10/1983 |
| WO | WO 89/10660 | 11/1989 |
| WO | WO89/10660 | 11/1989 |
| WO | WO98/19962 | 5/1998 |
| WO | WO 98/29962 | 7/1998 |
| WO | WO 99/17476 | 4/1999 |
| WO | WO 01/48946 A1 | 7/2001 |
| WO | WO 2004/036513 A1 | 4/2004 |
| WO | WO 2005/002109 A2 | 1/2005 |
| WO | WO 2006/006759 A1 | 1/2006 |

* cited by examiner

Primary Examiner — Marisol Figueroa
(74) Attorney, Agent, or Firm — Muirhead and Saturnelli, LLC (57) ABSTRACT

Configuring a cellular telecommunications network base station repeater for use at a particular location includes performing data collection activity at the location to obtain an indication of the transmit frequency of a nearby base station of the cellular telecommunications network. The repeater is then set to amplify received signals at that frequency. By only amplifying this particular frequency, the repeater can provide cellular telecommunications coverage at a location (for example a basement) where coverage might not otherwise be available by amplifying only the relevant frequency. This is in contrast to amplifying indiscriminately a wide range of frequencies, which can interfere with other radio transmissions.

25 Claims, 6 Drawing Sheets

CONFIGURATION OF BASE STATION REPEATER

TECHNICAL FIELD

This application relates to a method of configuring a cellular telecommunications network base station repeater for use at a particular location. This application also relates to a repeater.

BACKGROUND TO THE INVENTION

Base station repeaters are used to provide or improve the radio coverage of a cellular or mobile telecommunications network at locations where that coverage is not available or poor. For example, in the basement of a building, the radio signals from a base station of the mobile telecommunications network may be attenuated by the surrounding ground such that a mobile telecommunications device cannot be used in the basement to make or receive calls using the mobile telecommunications network.

Known repeaters repeat (amplify) received radio signals over a frequency band, or at least a large range of frequencies. The amplification of large frequency bands indiscriminately can cause interference with the mobile telecommunications network and to surrounding radio telecommunications services.

Another conventional approach is to pre-configure a repeater to work at a particular frequency prior to shipping the repeater to an end user. However, this requires the supplier of the repeater to ascertain the appropriate frequency before shipping the repeater. In a mobile telecommunications network, the appropriate frequency will depend upon the precise location at which the repeater will be used. Therefore, ascertaining the appropriate frequency is not straightforward.

Yet another conventional approach is to ship the repeater in an unconfigured state and to require the end user to set the frequency of the repeater when installing it. However, such an arrangement requires considerable end user knowledge, and is therefore prone to error.

There have also been proposals for repeaters to be configured after shipping to an end user by establishing a communication session between the repeater and a remote control centre. The remote control centre instructs the repeater to operate on certain frequencies. Such an arrangement is disadvantageous because: (1) it requires a control centre and a repeater to have the necessary hardware and software components to establish a communication session, and (2) the control centre will need to know the precise location at which the repeater is used in order to instruct the repeater to amplify signals at an appropriate frequency (the selection of an appropriate frequency not being straightforward in a mobile telecommunications network, as discussed above).

BRIEF SUMMARY OF THE INVENTION

According to the system described herein, a method of configuring a cellular or mobile telecommunications network base station repeater for use at a location includes performing an (automated) data collection activity at the location to obtain an indication of the transmit frequency of a nearby base station of the cellular or mobile telecommunications network and setting the repeater to amplify received signals at said frequency.

The data collection activity may comprise a measurement step.

Thus, a measurement indicative of the transmit frequency of a nearby base station may be made at the location of the intended use of the repeater. The repeater is then automatically set to amplify (only) received signals at this frequency. Advantageously, all frequencies are not indiscriminately amplified, thereby reducing interference. Further, the user is not required to manually set the frequency of the repeater at the location of intended use, thereby obviating any requirement for user technical knowledge. Further, there is no requirement for the repeater to be able to establish a communication session with a remote control centre in order to download the frequency at which it should be operated.

The embodiments of the system described herein to be described in more detail below provide a repeater which can be configured in situ without requiring user knowledge or intervention and which only amplifies appropriate frequencies to improve radio access to the chosen mobile telecommunications network at the selected location.

The measuring step may be performed by a mobile telecommunications device registered with the mobile telecommunications network, such as a mobile handset. The measurements made are received by the repeater and used to set the frequency that is to be amplified. The repeater may be configured to instruct the mobile telecommunications device to provide it with the frequency by transmitting AT commands to that mobile telecommunications device. These AT commands, and the responses from the mobile telecommunications device, could be transmitted via a Bluetooth® connection, USB cable connection or the like. The mobile telecommunications device will be aware of the appropriate frequency for the repeater to amplify because this will be ascertained by the mobile telecommunications device as a frequency with which it communicates with the nearby base station of the mobile telecommunications network. Additionally the frequencies of neighbouring cells may be ascertained by the mobile telecommunications device.

In some embodiments the repeater includes a receiver. The receiver may measure the frequency of radio transmissions between the mobile telecommunications device registered with the mobile telecommunications network and the nearby base station. That is, the receiver effectively intercepts communications between the mobile telecommunications device and the base station and analyses the frequency used.

Alternatively, the receiver may perform the data collection activity to obtain directly the frequency of radio transmission from the nearby base station. The repeater may be provided with a mobile telecommunications receiver for performing this functionality. The receiver in one embodiment obtains from the base station details of neighbouring base stations. The nearby base station may transmit details of neighbouring base stations in accordance with the appropriate mobile telecommunication Standards to facilitate the decision of a handover procedure. The details of the neighbouring base stations are typically the frequencies of neighbouring base stations. Details of the neighbouring base stations may be used to set the repeater to amplify the received signals at the frequency of each of the neighbouring base stations. The nearby base station and the neighbouring base stations may comprise base stations of respective first and second types. That is, some of the base stations will be of the first type, and other of the base stations will be of the second type. The receiver in an embodiment receives details, from the nearby base station which is of the first type, of the neighbouring base stations, which include base stations of the second type. The repeater then amplifies received signals from base stations of both the first and second type. However, the receiver only collects data from base stations of the first type, and not from base stations of the second type. Advantageously, the receiver does not need to be able to obtain data from base stations of the second type. The data obtained from base stations of the first type provides the repeater with information to amplify signals from base stations of both the first and second type. The first type of base station may be a 2G base station and the second type of base station may be a 3G or 4G base station. Generally, base stations of the first type will be of a less expensive type than base stations of the second type.

Advantageously, the repeater only determines the frequency of a particular mobile telecommunications network and ignores transmissions from base stations of other cellular telecommunications networks. For example, for a repeater operating in the United Kingdom, the repeater might be configured to only measure the frequencies of base stations of the Vodafone® network and to ignore transmissions from base stations of other mobile telecommunications networks. Transmissions from the base station of a mobile telecommunications network include a Mobile Network Code (MNC). The repeater may use the MNC to determine which radio transmissions should be measured. The MNC may be pre-programmed into the repeater prior to shipping the repeater to the end user. Alternatively, the MNC may be obtained from the user when the repeater is in situ. For example, the repeater may be configured to read a subscriber identity module (SIM) of a mobile telecommunications device of the user and to extract the mobile network code from that SIM.

The cellular telecommunications network may be a GSM, GPRS or UMTS network, for example.

According further to the system described herein, a cellular telecommunications network base station repeater for use at a location includes a data collection device operable to obtain a measurement at the location indicative of the transmit frequency of a nearby base station of the cellular telecommunications network and a setting device operable to set the repeater to amplify received signals at said frequency.

BRIEF DESCRIPTION OF THE DRAWINGS

Embodiments of the system described herein will now be explained, by way of example, with reference to the accompanying drawings, in which.

In the drawings like elements are designated with the same reference signs.

DETAILED DESCRIPTION OF VARIOUS EMBODIMENTS OF THE INVENTION

Elements of a conventional mobile or cellular network will now be briefly described with reference to FIG. 1.

Figure 1:
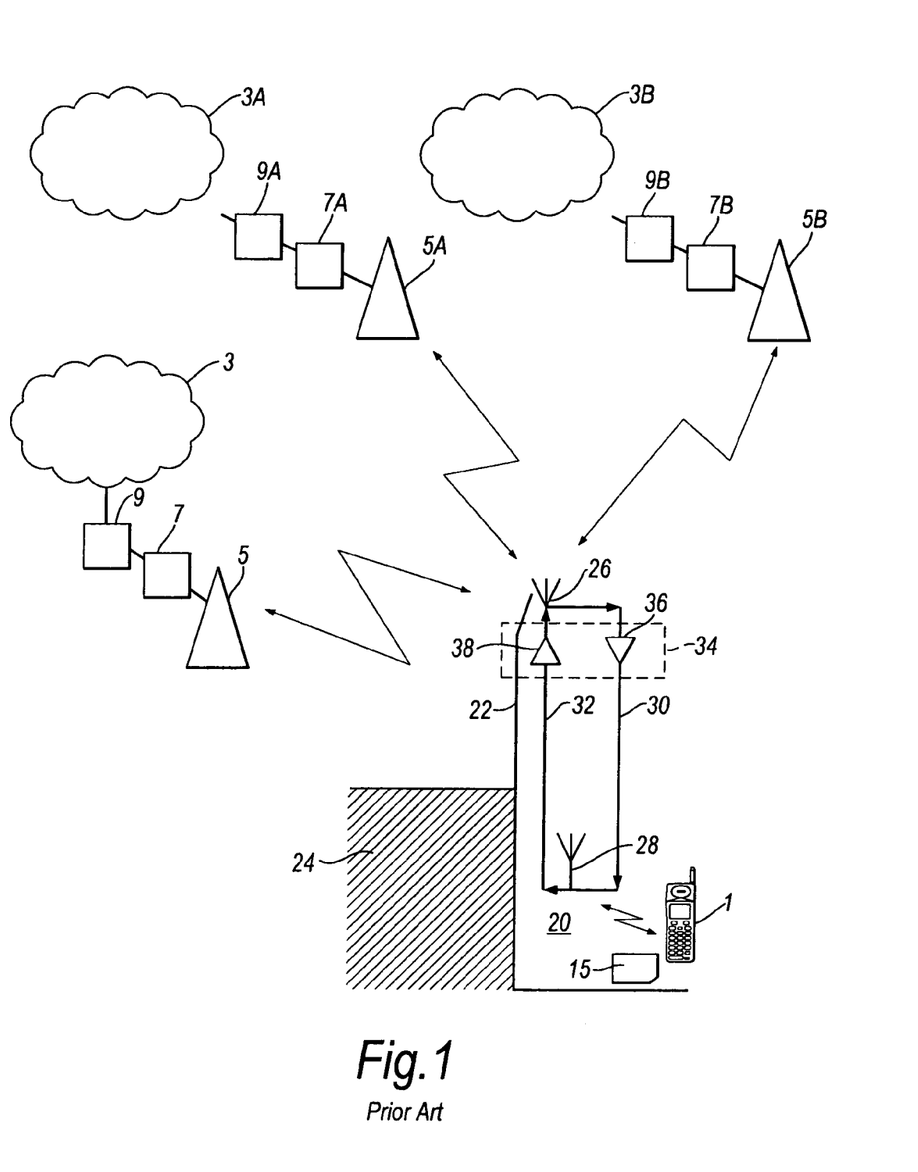
FIG. 1 shows schematically a prior art repeater for amplifying mobile telecommunications network frequencies at a particular location.

FIG. 1 shows schematically a mobile or cellular network.

Mobile terminal 1 is registered with GSM/GPRS or UMTS (3G) mobile telecommunications network 3. The mobile terminal 1 may be a handheld mobile telephone, a personal digital assistant (PDA) or a laptop computer equipped with a datacard. The mobile terminal 1 communicates wirelessly with mobile telecommunications network 3 via the radio access network (RAN) of the mobile telecommunications network 3, comprising, in the case of a UMTS network, base station (Node B) 5, and radio network controller (RNC) 7. Communications between the mobile terminal 1 and the mobile telecommunications network 3 are routed from the radio access network via GPRS support nodes (SGSN) 9, which may be connected by a fixed (cable) link to the mobile telecommunications network 3.

In the conventional manner, a multiplicity of other mobile terminals (not shown) are registered with the mobile telecommunications network 3.

The mobile telecommunications network 3 includes a gateway GPRS support node (GGSN) which enables IP-based communications with other networks, such as the Internet or other IP network via an appropriate link.

Each of the mobile terminals 1 is provided with a respective subscriber identity module (SIM) 15. During the manufacturing process of each SIM, authentication information is stored thereon under the control of the mobile telecommunications network 3. The mobile telecommunications network 3 itself stores details of each of the SIMs issued under its control. In operation of the mobile telecommunications network 3, the terminal 1 is authenticated (for example, when the user activates the terminal in the network with a view to making or receiving calls) by the network sending a challenge to the terminal 1 incorporating a SIM 15, in response to which the SIM 15 calculates a reply (dependent on the predetermined information held on the SIM—typically an authentication algorithm and a unique key Ki) and transmits it back to the mobile telecommunications network 3. The mobile telecommunications network 3 includes an authentication processor which generates the challenge and which receives the reply from the terminal 1.

Using information pre-stored concerning the content of the relevant SIM 15, the authentication processor calculates the expected value of the reply from the mobile terminal 1. If the reply received matches the expected calculated reply, the SIM 15 and the associated mobile terminal are considered to be authenticated.

The SIM 15 used by the terminal 1 may be a SIM of the type defined in the GSM or UMTS standards specifications, or may be a simulation of a SIM—that is, software or hardware that performs a function corresponding to that of the SIM. The SIM may be in accordance with the arrangement described in WO-A-2004 036513.

In some locations communication with the base station 5 of the network 3 with which the mobile terminal 1 is registered cannot be satisfactorily performed. Such a situation is shown in FIG. 1, where the mobile terminal 1 is located in the basement 20 of a building 22. The ground 24 surrounding the basement attenuates signals transmitted between the base station 5 and the mobile terminal 1 such that any signals which are received by the base station 5 and mobile terminal 1 are so weak that satisfactory communication between the base station 5 and the mobile terminal 1 cannot be performed.

In a known manner a repeater antenna 26 is provided at a position on the building 22 which is such that communications can satisfactorily be transmitted between the repeater antenna 26 and the base station 5. The repeater antenna 26 is electrically coupled to a supplementary antenna 28 located in the basement 20 by cable 30, which feeds signals received by the repeater antenna 26 to the supplementary antenna 28. The supplementary antenna 28 communicates wirelessly with the mobile terminal 1 located in the basement 20 using GSM or UMTS transmission protocols. Signals received by the mobile terminal 1 from the supplementary antenna 28 appear to the mobile terminal 1 as if they were received directly from the base station 5.

Signals received from the supplementary antenna 28 from the mobile terminal 1 are communicated to the repeater antenna 26 by cable 32. These signals received by the antenna 28 are then transmitted by the repeater antenna 26 to the base station 5.

A repeater 34 is provided which includes an incoming amplifier 36 and an outgoing amplifier 38. The incoming amplifier 36 amplifies signals received by repeater antenna 26 as they are transmitted to the supplementary antenna 28 by cable 30. The outgoing amplifier 38 amplifies signals received by the supplementary antenna 28 as they are passed to the repeater antenna 26 via cable 32.

The amplifiers 36,38 of the repeater 34 amplify a frequency band, or a relatively large range of frequencies. For example, the amplifiers 36,38 of the repeater may amplify all frequencies allocated by the governmental regulatory authority which licenses mobile telecommunications networks of a particular type to operate in the country in which the building 22 is located. Thus, the amplifiers 36,38 of the repeater 34 may amplify all frequencies allocated to GSM and/or UMTS mobile telecommunications networks in the United Kingdom, for example. This ensures that the frequency at which the base station 5 transmits is amplified by the repeater 34. However, as indicated above, it is disadvantageous to indiscriminately amplify a large range of frequencies. In many locations, in addition to radio transmission from the base station 5, the repeater antenna 26 will also pick up radio transmissions from other mobile telecommunications network 3A and 3B. Each of those networks has its own base stations, one of each of which is shown at 5A,5B, radio network controllers 7A,7B and SGSNs 9A,9B. Typically, there will also be other ambient radio signals—for example those from WLAN access points, television broadcasts etc. The frequency of transmissions from the neighbouring base station 5, base station 5A and base station 5B are selected to be different so that each of the respective networks 3,3A and 3B at a particular location can all operate effectively together. However, because the repeater 34 amplifies a range of frequencies that includes the frequency of transmission of the base station 5,5A and 5B, these amplified signals tend to cause interference, and may prevent wireless equipment operating correctly in the building, such as WLAN access points.

Figure 2:
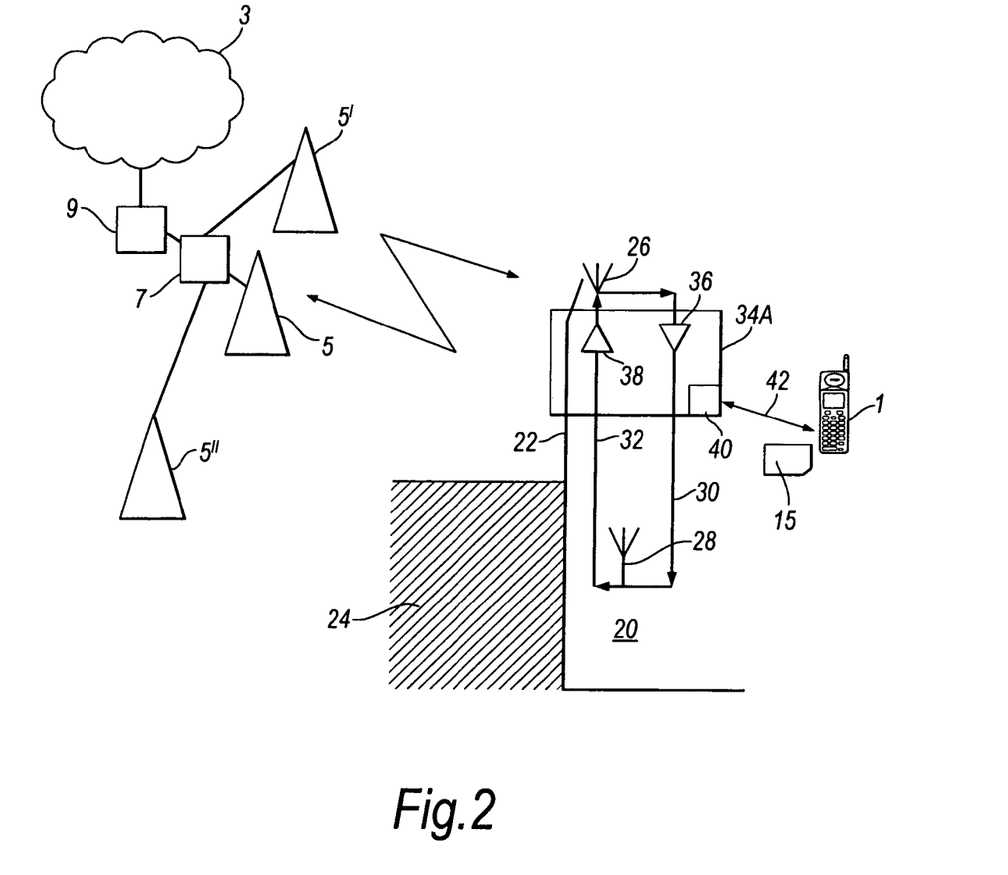
FIG. 2 shows schematically a repeater for use with a mobile telecommunications network in accordance with a first embodiment of the system described herein.

FIG. 2 shows a repeater 34A arranged in accordance with a first embodiment of the invention. Repeater 34A includes a processor 40 for interrogating mobile terminal 1.

In the conventional manner, when the mobile terminal 1 is at a location where it can communicate directly with the base station 5 (i.e. without the aid of a repeater), the frequency of the communications between the mobile terminal 1 and the base station 5 is selected and recorded by the mobile terminal 1.

The processor 40 is configured to generate AT commands that are used for interrogating the mobile terminal 1. The processor 40 is coupled to the mobile terminal 1 by a suitable link 42, such as a Bluetooth link or a USB cable link.

After initial handshake procedure between the processor 40 and the mobile terminal 1 when the link 42 is initially established, AT commands are generated by the processor 40 and interrogate the mobile terminal 1 to determine the manufacturer and model. The processor 40 stores data for various makes and models of mobile terminals indicating how the communication frequency of that mobile terminal with the base station with which it is registered can be obtained. The processor 40 uses this stored data and the received information from the mobile terminal 1 to generate an appropriate AT command to extract from the mobile terminal 1 the relevant frequency with which it communicates with the base station 5 with which it is registered. This frequency data is transmitted between the mobile terminal and the processor 40 also via link 42.

In addition to obtaining the frequency of what might be the nearest base station 5, the processor 40 might also extract the frequencies of neighbouring base stations 5' and 5" of the network 3.

The amplifiers 36 and 38 are configured to amplify only a selected frequency, frequencies or frequency band in dependence upon the data obtained by the processor 40 from the mobile terminal 1. For example, the amplifiers 36,38 may be configured to only amplify signals received from the antennae 26,28 at the frequency, frequencies or frequency band at which the base station 5 transmits. Alternatively, the amplifiers 36 and 38 may be configured to additionally amplify the frequencies at which the neighbouring base stations 5,5' and 5" of the same network 3 transmit.

By amplifying only a selected frequency, frequencies or frequency band, power is saved and interference is reduced. The frequencies transmitted by the base stations 5A and 5B (shown in FIG. 1 but not shown in FIG. 2 for the sake of clarity) are not amplified by the amplifiers 36,38 because the frequency information obtained from the mobile terminal 1 by the processor via link 42 only relates to frequencies at which the mobile terminal 1 communicates with the network 3 with which it is registered. That network 3 only communicates to the mobile terminal 1 via base stations 5,5',5" etc. forming part of the radio access network of the network 3. The base stations 5A,5B of other networks 3A,3B are not used for communications between the mobile terminal 1 and the network 3 with which it is registered.

When the mobile terminal 1 is located in the basement 20 in accordance with the first embodiment of the invention, signals transmitted between the mobile terminal 1 and the supplementary antenna 28 are amplified by the amplifiers 36,38 only for particular frequencies. This allows radio communication to be performed between the mobile terminal 1 and the base station 5 in an area (the basement 20) where such radio communication would not be possible without the repeater 34A. However, because only a selected frequency, frequencies or band of frequencies are amplified, interference caused by the repeater 34A is reduced.

Figure 3:
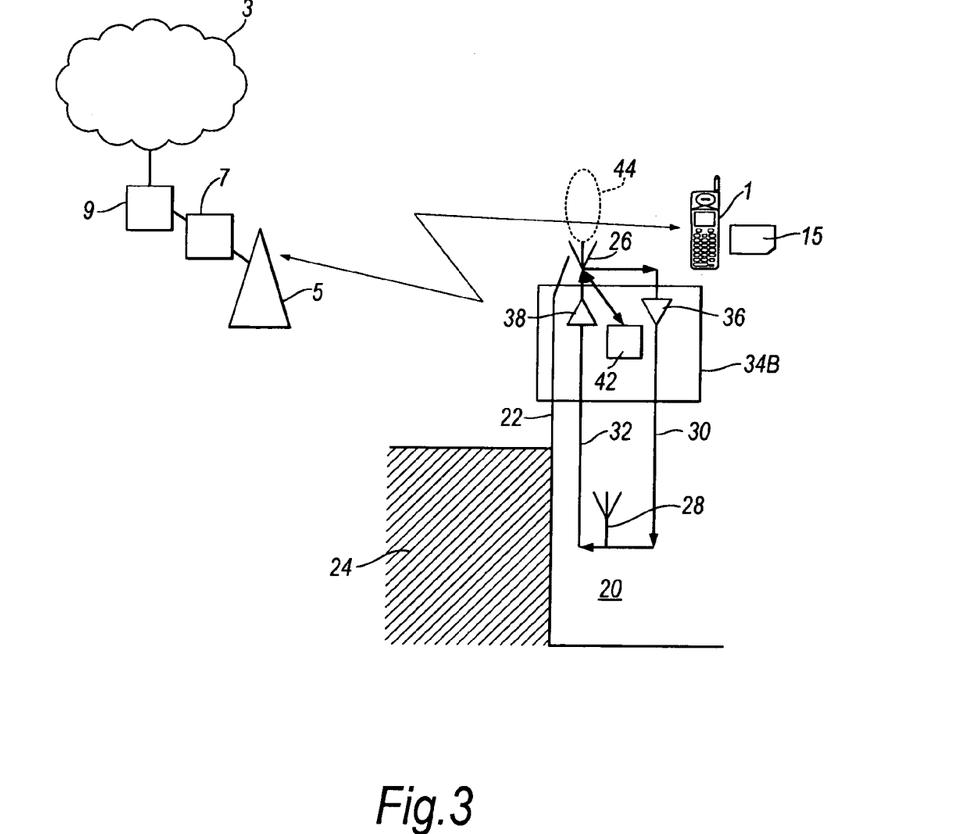
FIG. 3 shows schematically a repeater in accordance with a second embodiment of the system described herein.

FIG. 3 shows a second embodiment of the invention. In this second embodiment the repeater 34B is modified to include a receiver 42 coupled to the repeater antenna 26. The receiver uses the antenna 26 to monitor radio communications between the mobile terminal 1 and the base station 5 when the mobile terminal 1 is in a position (not in the basement 20) where it can perform direct radio communications with the base station 5 without the use of a repeater. These communications are intercepted, as indicated by dashed ellipse 44, by the repeater antenna 26 and a signal representative of the frequency at which the communication between the mobile terminal 1 and the base station 5 occurs is generated and passed to the receiver 42. The receiver 42 then configures the amplifiers 36 and 38 to amplify only at the frequency, frequencies or band of frequencies used in communications between the mobile terminal 1 and the base station 5.

In a similar manner to the first embodiment, the frequency used by the mobile terminal 1 to communicate with other base stations 5' and 5" the network 3 may also be detected by the antenna and recorded by the receiver 42, so that the amplifiers 36,38 are configured to amplify these frequencies too.

The second embodiment provides similar advantages to the first embodiment. That is, only selected frequencies are amplified, these frequencies being those used by the base station 5 or base stations 5,5' and 5" which transmit at the location of the repeater 34B. Therefore, interference is reduced.

Figure 4:
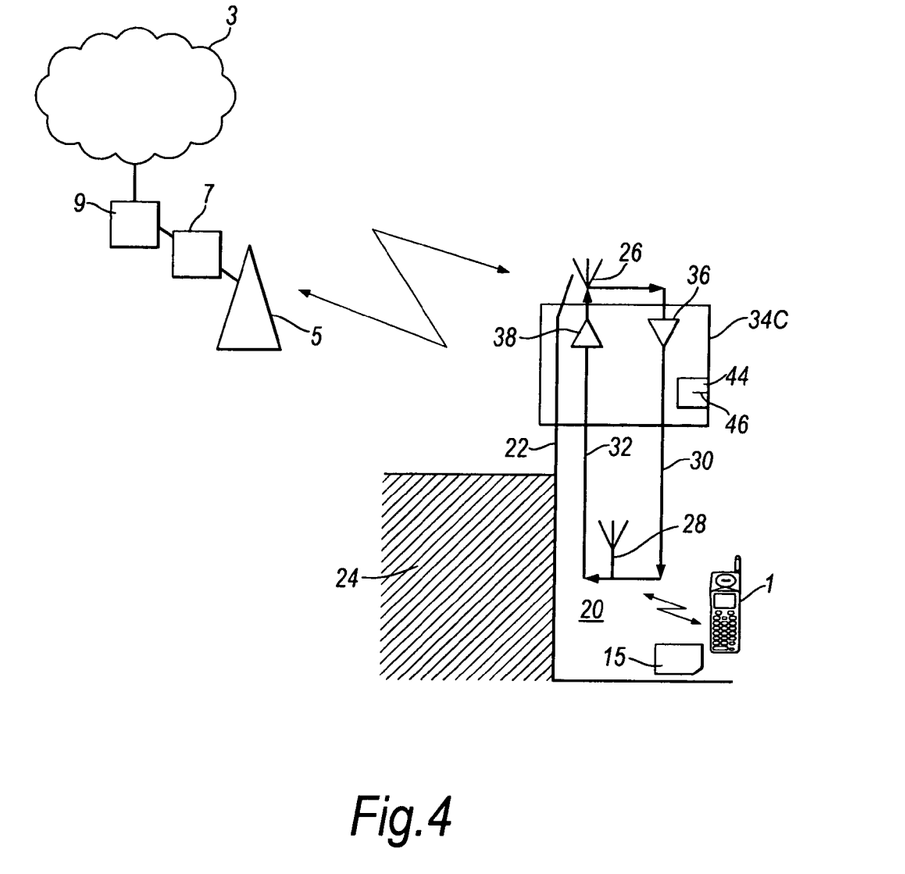
FIG. 4 shows schematically a repeater in accordance with third embodiment of the system described herein.

A third embodiment of the invention will now be described with reference to FIG. 4.

In an additional embodiment the repeater 34C is provided with a mobile telecommunications receiver 44. The receiver 44 operates in a similar manner to the receiver provided in mobile terminal 1 and is capable of receiving communications from the base station 5 (and other base stations providing mobile telecommunication services) and determining the frequency, and optionally the received signal level of those communications as received at the repeater antenna 26. The receiver 44 is arranged to configure the amplifiers 36,38 to only amplify frequencies received by the repeater antenna 26, and optionally to set appropriate gain of the amplifiers based upon the received signal level.

However, as will be understood from the preceding discussion, the repeater antenna 26 may receive signals from neighbouring base stations 5A,5B etc. of networks 3A and 3B other than the network 3 with which the mobile terminal 1 is registered. If the amplifiers 36 and 38 were configured by the receiver 34 to amplify all these frequencies received by the repeater antenna 26, this would result in interference and would be wasteful because only signals from the base station 5 (and possibly surrounding base stations 5' and 5" of the network 3 with which the mobile terminal 1 is registered) are required to be amplified in order to provide mobile radio coverage in the basement 20.

In order to set the amplifiers 36 and 38 to only amplify the frequencies of the base stations 5,5' and 5" etc. of the network 3 with which the mobile terminal 1 is registered, the receiver 44 may be configured in a number of different ways.

Firstly, the receiver 44 may be configured prior to shipping to the end user to only measure the frequencies of radio signals from base stations 5,5' and 5" etc. of the networks 3. This could be done by providing the receiver 44 with the MNC of the network 3. The MNC value may be pre-stored in the repeater 34C before shipping to the end user. Transmissions from base stations of other networks (5A,5B, etc.) will include a different MNC and can therefore be identified and ignored by the receiver 44. The receiver 44 will potentially only identify frequencies of base stations 5,5',5", 5A and 5B in the vicinity of the receiver 44. Signals from more distant base stations will not be received at the receiver 44 because they are attenuated due to the distance between the receiver 44 and those distant base stations. By determining which MNC is transmitted by each of the base stations 5,5',5",5A and 5B within radio communication distance of the repeater antenna 26, the receiver 44 can then ignore frequencies transmitted by networks having particular MNC values.

Alternatively, the receiver 44 could be configured with a reader 46 for operative coupling with the SIM 15 associated with the mobile terminal 1. For example, when the user of mobile terminal 1 initially receivers the repeater 34C (which might typically be supplied under the control of the network 3), the user powers up the repeater 34C and inserts the SIM 15 that is usually coupled to the SIM card reader of the mobile terminal 1 into the SIM reader 46 of the receiver 44. The SIM reader 46 then extracts the MNC from the SIM 15 and stores it. The SIM 15 can then be removed from the SIM reader 46 and used in the mobile terminal in the usual way. When the repeater 34C is then activated, it then uses the stored MNC to distinguish base station transmissions received by the repeater antenna 26 of the network 3 from transmissions of other networks (3A,3B) and configures the amplifiers 36 and 38 to only amplify the frequencies used by the base station (5,5' and 5") of the network 3.

Receivers incorporated into repeaters tend to be relatively expensive pieces of hardware which can impact the manufacturing price of the repeater unit. In particular receivers designed to receive 3G radio signals (3G receivers) can be as much as ten times the cost of those designed to receive 2G radio signals (2G receivers). Therefore, the cost of incorporating a 3G receiver into a 3G repeater could be obstructive to the market cost of the repeater unit. This is a potential problem since there is potential for widespread use of 3G repeaters. The embodiment of FIG. 5 addresses this particular problem.

Figure 5:
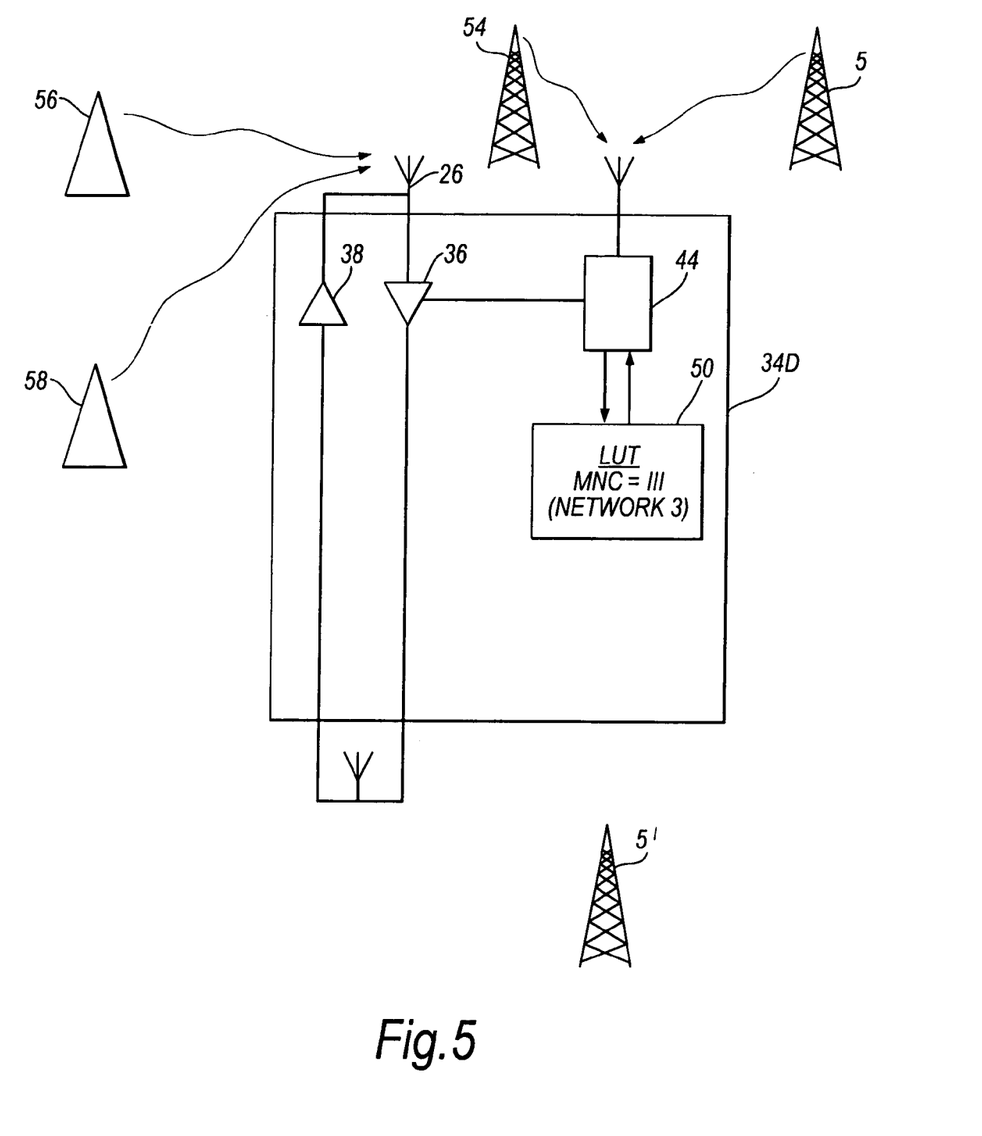
FIG. 5 shows schematically a repeater in accordance with a fourth embodiment of the system described herein.
Figure 6:
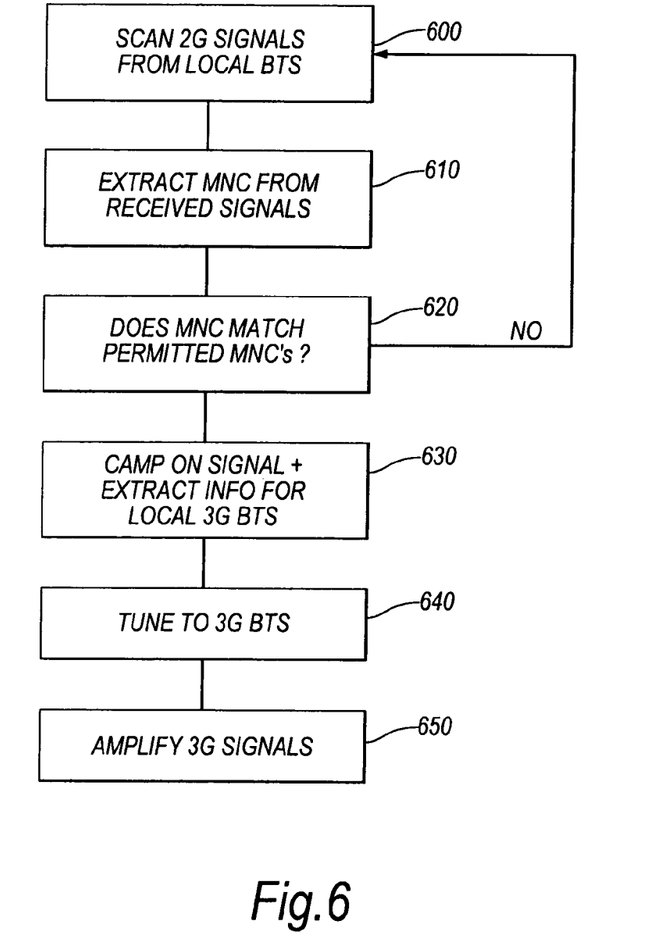
FIG. 6 is a flow chart showing steps performed in accordance with the fourth embodiment of the system described herein.

The embodiment shown in FIG. 5 shows a repeater designed to amplify 3G signals (3G repeater) 34D. The steps taken during use of repeater 34C are shown in FIG. 6. Similarly to the embodiment of FIG. 4, repeater 34D is provided with at least one MNC associated with the networks whose signals it is permitted to amplify. These MNCs are stored in look up table 50. In the embodiment of FIG. 5, repeater 34D is permitted to amplify 3G radio signals from network 3 which has MNC value 111. This MNC value may have been pre-stored before shipping, extracted from a SIM or provided to the repeater in another way.

Mobile broadcasts from base stations identify details of all neighbour base stations on the same network. The broadcasts include the details for both neighbour 2G and 3G base stations on the network regardless of whether the broadcast is over a 2G or 3G network (this is to ensure that a handset receiving the broadcast can tune to signals from neighbour base stations and measure signal strength from all local base stations in order to decide when to handover). Thus, a receiver which receives a signal from 2G or 3G base station for a particular network is made aware of all neighbour 2G and 3G base stations on the same network.

Repeater 34D is in coverage area of base stations 5 and 54 which, in the example of FIG. 5, are 2G base stations. Base station 5 is associated with network 3 which is identified by MNC 111 and base station 54 is associated with network B which is identified by MNC 112. Repeater 34D is also in the coverage area of 3G base stations 56 and 58. Both 3G base stations operate on network 3.

Repeater 34D includes 2G receiver 44. 2G receiver scans across 2G radio frequencies to identify signals from local 2G base stations at 600. Receiver 44 may be triggered to scan the radio frequencies on power up and/or periodically. As discussed above, the broadcasts from the base stations include the MNC associated with the network broadcasting the signal. On scanning the 2G radio frequencies, repeater 34D receives 2G signals from 2G base stations, 5 and 54. Receiver 44 identifies the MNCs associated with the networks from the signals received from base stations 5 and 54 at 610. It compares the MNCs within the received broadcasts with the MNC value stored in its look up table 50 at 620. At 620 repeater 34D identifies that the MNC stored in the look up table (111) matches that within the signal from base station 5. Therefore, it is permitted to amplify signals from base stations associated with the same network as that of base station 5 (i.e. network 3).

Receiver 44 then camps on the signal from base station 5 and extracts from that signal information identifying local 2G and 3G base stations on the same network at 630. The extracted information includes identification of the frequency used for transmission of all neighbour 2G and 3G base stations on network 3, namely 2G base station 5' and 3G base stations 56 and 58.

Repeater 34D then tunes its incoming 3G amplifier 36 to either 3G base station 56 or 58 using the information broadcast from base station 52 at 640. 3G amplifier 36 may be connected to a specific 3G antenna 26 or, alternatively, the repeater may have a single antenna used to receive both 2G and 3G radio signals. Repeater 34D then tunes both its incoming amplifier 36 and outgoing amplifier 38 to the 3G frequency of the selected 3G base station at 650.

An advantage provided by the embodiment of FIG. 5 is that 3G repeater 34D is able to identify and tune to local 3G base stations and, consequently, amplify the local 3G signals without requiring a 3G receiver. This provides a cost reduction to the price of the 3G repeater compared with those including 3G receivers.

As described in the above embodiments, the repeater 34A, 34B, 34C and 34D may amplify the signal of one base station 5, or also other neighbouring base stations 5' and 5" of the same network 3. The base station 5 is the base station with the strongest signal as received at the repeater antenna 26, and will typically (though not necessarily) be the base station nearest to the repeater antenna 26. However, at some locations within the coverage area of a mobile telecommunications network, the repeater antenna may be in a position where several base stations (for example, base stations 5,5' and 5") all provide radio coverage of a similar power and quality as received at the repeater antenna 26. In such a situation, it is advantageous that the repeater 34A, 34B, 34C and 34D is configured to amplify not only the signals received from the base station 5, but also from the base stations 5' and 5". This allows the repeater to provide (amplified) radio coverage in the basement 20 from all of the three base stations 5,5' and 5" at the repeater antenna 26. The mobile terminal may then handover between the base stations 5,5' and 5" in the usual way in accordance with the GSM and UMTS Standards in dependence upon which base station provides the best radio signal at the repeater antenna 26 (and therefore also the best amplified signal in the basement 20) at a particular time.

The repeater 34B records the channels which are used by mobile devices in proximity to the repeater antenna 26 through the monitoring of the power within the transmission bands. Due to the fixed duplex nature of the FDD spectrum allocations or fixed allocation of TDD bands, the downlink frequencies that should be configured can also be allocated on the repeater.

The conventional definition of a repeater is an amplifier which receives weak signals and delivers corresponding stronger signals without re-shaping waveforms. The term "repeater" used in this specification is intended to include repeaters of this type.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of configuring a cellular telecommunications network base station repeater for use at a location, comprising:

performing, with a cellular telecommunications device registered with a cellular telecommunications network, a data collection activity at the location to obtain an indication of a transmit frequency of a nearby base station of the cellular telecommunications network;

receiving, at the repeater, the indication of the transmit frequency from the cellular telecommunications device; and setting the repeater to amplify received signals at said transmit frequency, wherein the repeater only amplifies the transmit frequencies of communications from a particular cellular telecommunications network, and determines the transmit frequency to be amplified in dependence upon a predetermined mobile network code of the particular cellular telecommunications network, and wherein the repeater receives a subscriber identity module associated with a mobile telecommunications device of the cellular telecommunications network and extracts from that subscriber identity module the mobile network code.

2. The method of claim 1, wherein the repeater uses AT commands to obtain the indication of the transmit frequency from the cellular telecommunications device.

3. The method of claim 1, wherein the indication of the transmit frequency is a measurement of radio transmission frequency between the cellular telecommunications device and the nearby base station.

4. The method of claim 1, wherein the repeater further obtains respective transmit frequencies of other neighbouring base stations.

5. The method of claim 4, further comprising:
setting the repeater to amplify received signals at each of the transmit frequencies of the other neighbouring base stations.

6. In a cellular telecommunications network including base stations of at least a first and second type, a method of configuring a base station repeater for use at a particular location such that the repeater is configured to communicate with base stations of the second type, the method comprising:

using a receiver associated with the repeater, the receiver being configured to communicate only with base stations of the first type, to collect data from a first nearby base station of the first type;

analyzing the collected data to determine a transmit frequency of a second nearby base station being a base station of the second type; and setting the repeater to amplify received signals at the transmit frequency.

7. The method of claim 6, wherein the receiver further collects data of other neighbouring base stations of the first and second types.

8. The method of claim 6, wherein the first type comprises 2G and the second type comprises 3G or LTE/SAE/4G.

9. The method of claim 6, wherein the repeater only amplifies the transmit frequencies of communications from a particular cellular telecommunications network, and determines the transmit frequency to be amplified in dependence upon a predetermined mobile network code of the particular cellular telecommunications network.

10. The method of claim 9, wherein the mobile network code is pre-programmed onto the repeater.

11. The method of claim 6, further comprising:
comparing the collected data with a mobile network code corresponding to base stations of the first and second types, with which the repeater is permitted to amplify, in order to obtain the transmit frequency of the second nearby base station of the second type.

12. The method of claim 9, wherein the repeater receives a subscriber identity module associated with a mobile telecommunications device of the cellular telecommunications network and extracts from that subscriber identity module the mobile network code.

13. A cellular telecommunications network base station repeater for use at a location, comprising:
- a processor configured for coupling with a cellular telecommunications device registered with a cellular telecommunications network, wherein the cellular telecommunications device is configured to perform a data collection activity at the location so as to enable the processor to obtain an indication of the transmit frequency of a nearby base station of the cellular telecommunications network; and
- a setting device configured to set the repeater to amplify received signals at said transmit frequency, wherein the repeater is configured to only amplify the transmit frequencies of communications from a particular cellular telecommunications network, wherein the processor is configured to determine the transmit frequencies to be amplified in dependence upon a predetermined mobile network code of the particular cellular telecommunications network, and wherein the repeater is configured to receive a subscriber identity module associated with a mobile telecommunications device of the cellular telecommunications network and to extract from the subscriber identity module the mobile network code.

14. The repeater of claim 13, wherein the repeater includes a receiver that receives the indication of the transmit frequency from the cellular telecommunications device, wherein the indication is a measurement of radio transmission frequency between the cellular telecommunications device and the nearby base station.

15. The repeater of claim 13, wherein the repeater is configured to generate AT commands to obtain the indication from the cellular telecommunications device.

16. The repeater of claim 13, wherein the repeater is further configured to obtain respective transmit frequencies of other neighbouring base stations.

17. The repeater of claim 16, wherein the setting device is further configured to set the repeater to amplify received signals at each of the frequencies of the other neighbouring base stations.

18. A cellular telecommunications network base station repeater operable in a cellular telecommunications network including base stations of at least a first and second type, the repeater comprising:
- a receiver configured to communicate only with base stations of the first type and to collect data from a first nearby base station of the first type for use in configuring the repeater at a particular location;
- a processor configured to analyze the collected data to determine a transmit frequency of a second nearby base station being a base station of the second type; and
- a setting device configured to set the repeater to amplify received signals at the transmit frequency.

19. The repeater of claim 18, wherein the receiver is further configured to collect data of other neighbouring base stations of the first and second type.

20. The repeater of claim 18, wherein said repeater is configured to amplify received signals from the base stations of said first and second type.

21. The repeater of claim 18, wherein the first type comprises 2G and the second type comprises 3G or LTE/SAE/4G.

22. The repeater of claim 18, wherein the repeater is configured to only amplify the transmit frequencies of communications from a particular cellular telecommunications network, and wherein the processor is configured to determine the transmit frequencies to be amplified in dependence upon a predetermined mobile network code of the particular cellular telecommunications network.

23. The repeater of claim 22, wherein the mobile network code is pre-programmed onto the repeater.

24. The repeater of claim 18, wherein the processor is configured to analyze the collected data by comparing the collected data with a mobile network code corresponding to base stations of the first and second type, with which the repeater is permitted to amplify, in order to obtain the transmit frequency of the nearby base station of the second type.

25. The repeater of claim 22, wherein the repeater is configured to receive a subscriber identity module associated with a mobile telecommunications device of the cellular telecommunications network and to extract from the subscriber identity module the mobile network code.

\* \* \* \* \*